US009880671B2

(12) United States Patent
Lynn et al.

(10) Patent No.: US 9,880,671 B2
(45) Date of Patent: Jan. 30, 2018

(54) DAMPING VIBRATIONAL WAVE REFLECTIONS

(71) Applicant: Sentons Inc., Grand Cayman (KY)

(72) Inventors: Lapoe E. Lynn, Los Altos, CA (US); Yenyu Hsieh, San Jose, CA (US); Michael L. Khitrov, Santa Clara, CA (US); Allan Boerner, Sunnyvale, CA (US); Samuel W. Sheng, Saratoga, CA (US); Shih-Ming Shih, San Jose, CA (US)

(73) Assignee: Sentons Inc. (KY)

( * ) Notice: Subject to any disclaimer, the term of this patent is extended or adjusted under 35 U.S.C. 154(b) by 0 days.

(21) Appl. No.: 14/156,731

(22) Filed: Jan. 16, 2014

(65) Prior Publication Data
US 2015/0097814 A1    Apr. 9, 2015

Related U.S. Application Data

(60) Provisional application No. 61/888,479, filed on Oct. 8, 2013.

(51) Int. Cl.
G06F 3/043    (2006.01)
(52) U.S. Cl.
CPC ............ G06F 3/043 (2013.01); G06F 3/0436 (2013.01)
(58) Field of Classification Search
CPC .......... G06F 3/041; G06F 3/043; G06K 11/14
See application file for complete search history.

(56) References Cited

U.S. PATENT DOCUMENTS

| 3,487,137 A | | 12/1969 | LeRoy | |
|---|---|---|---|---|
| 3,786,202 A | * | 1/1974 | Schafft | 310/324 |
| 5,068,671 A | * | 11/1991 | Wicks | H01Q 13/085 |
| | | | | 343/799 |
| 5,451,723 A | * | 9/1995 | Huang | G06F 3/0436 |
| | | | | 178/18.04 |
| 5,739,479 A | | 4/1998 | Davis-Cannon et al. | |
| 5,784,054 A | | 7/1998 | Armstrong et al. | |

(Continued)

FOREIGN PATENT DOCUMENTS

EP    0942351 A1    9/1999
EP    1489482 A2    12/2004
(Continued)

OTHER PUBLICATIONS

Edward M. Kerwin Jr.. "Damping of flexural waves by a constrained viscoelastic layer." The Journal of the Acoustical society of America 31.7 (2005): 952-962.

(Continued)

*Primary Examiner* — Tony N Ngo
(74) *Attorney, Agent, or Firm* — Van Pelt, Yi & James LLP

(57) ABSTRACT

A touch input detector is disclosed. The touch input detector includes an acoustic transmitter for transmitting an acoustic wave across a touch input medium. The touch input detector also includes an acoustic receiver for receiving the transmitted acoustic wave, wherein the timing of the incidence of the acoustic wave on the acoustic receiver indicates at least a portion of a touch input location on a surface of the touch input medium. The touch input detector further includes an acoustic dampening material coupled to the touch input medium to dampen reflections of the transmitted acoustic wave.

20 Claims, 11 Drawing Sheets

(56) References Cited

U.S. PATENT DOCUMENTS

| | | |
|---|---|---|
| 5,854,450 A | 12/1998 | Kent |
| 5,883,457 A | 3/1999 | Rinde et al. |
| 6,091,406 A | 7/2000 | Kambara et al. |
| 6,254,105 B1 | 7/2001 | Rinde et al. |
| 6,473,075 B1 | 10/2002 | Gomes et al. |
| 6,535,147 B1 | 3/2003 | Masters et al. |
| 6,567,077 B2 | 5/2003 | Inoue et al. |
| 6,630,929 B1 | 10/2003 | Adler et al. |
| 6,636,201 B1 | 10/2003 | Gomes et al. |
| 6,741,237 B1 | 5/2004 | Bernard et al. |
| 6,856,259 B1 | 2/2005 | Sharp |
| 6,891,527 B1 | 5/2005 | Chapman et al. |
| 6,948,371 B2 | 9/2005 | Tanaka et al. |
| 7,000,474 B2 | 2/2006 | Kent |
| 7,006,081 B2 | 2/2006 | Kent et al. |
| 7,116,315 B2 | 10/2006 | Sharp et al. |
| 7,119,800 B2 | 10/2006 | Kent et al. |
| 7,187,369 B1 | 3/2007 | Kanbara et al. |
| 7,193,617 B1 | 3/2007 | Kanbara et al. |
| 7,204,148 B2 | 4/2007 | Tanaka et al. |
| 7,274,358 B2 | 9/2007 | Kent |
| 7,315,336 B2 | 1/2008 | North et al. |
| 7,345,677 B2 | 3/2008 | Ing et al. |
| 7,411,581 B2 | 8/2008 | Hardie-Bick |
| 7,411,584 B2 | 8/2008 | Hill et al. |
| 7,456,825 B2 | 11/2008 | Kent et al. |
| 7,511,711 B2 | 3/2009 | Ing et al. |
| 7,545,365 B2 | 6/2009 | Kent et al. |
| 7,583,255 B2 | 9/2009 | Ing |
| 7,649,807 B2 | 1/2010 | Ing |
| 7,683,894 B2 | 3/2010 | Kent |
| 7,920,133 B2 | 4/2011 | Tsumura et al. |
| 8,085,124 B2 | 12/2011 | Ing |
| 8,228,121 B2 | 7/2012 | Benhamouda et al. |
| 8,237,676 B2 | 8/2012 | Duheille et al. |
| 8,319,752 B2 | 11/2012 | Hardie-Bick |
| 8,325,159 B2 | 12/2012 | Kent et al. |
| 8,378,974 B2 | 2/2013 | Aroyan et al. |
| 8,392,486 B2 | 3/2013 | Ing |
| 8,427,423 B2 | 4/2013 | Tsumura |
| 8,436,808 B2 | 5/2013 | Chapman et al. |
| 8,493,332 B2 | 7/2013 | D'Souza |
| 8,576,202 B2 | 11/2013 | Tanaka et al. |
| 8,619,063 B2 | 12/2013 | Chaine et al. |
| 8,638,318 B2 | 1/2014 | Gao et al. |
| 8,648,815 B2 | 2/2014 | Kent et al. |
| 8,659,579 B2 | 2/2014 | Nadjar et al. |
| 8,670,290 B2 | 3/2014 | Aklil et al. |
| 8,681,128 B2 | 3/2014 | Scharff et al. |
| 8,692,809 B2 | 4/2014 | D'souza |
| 8,692,810 B2 | 4/2014 | Ing |
| 8,692,812 B2 | 4/2014 | Hecht |
| 8,730,213 B2 | 5/2014 | D'Souza et al. |
| 8,749,517 B2 | 6/2014 | Aklil |
| 8,823,685 B2 | 9/2014 | Scharff et al. |
| 8,854,339 B2 | 10/2014 | Kent et al. |
| 8,890,852 B2 | 11/2014 | Aroyan et al. |
| 8,896,429 B2 | 11/2014 | Chaine |
| 8,896,564 B2 | 11/2014 | Scharff et al. |
| 8,941,624 B2 | 1/2015 | Kent et al. |
| 8,946,973 B2 | 2/2015 | Pelletier |
| 8,994,696 B2 | 3/2015 | Berget et al. |
| 9,046,959 B2 | 6/2015 | Schevin et al. |
| 9,046,966 B2 | 6/2015 | D'Souza |
| 9,058,071 B2 | 6/2015 | Esteve |
| 2001/0048571 A1* | 12/2001 | Boutaghou ............ G11B 33/08 360/97.19 |
| 2007/0171212 A1* | 7/2007 | Sakurai ................. G06F 3/0436 345/177 |
| 2011/0096038 A1* | 4/2011 | Yeh ....................... G06F 3/0436 345/177 |
| 2011/0128255 A1* | 6/2011 | Feng ..................... G02B 6/0028 345/175 |
| 2013/0120323 A1* | 5/2013 | Scharff .................. G06F 3/043 345/177 |
| 2013/0127755 A1 | 5/2013 | Lynn et al. |

FOREIGN PATENT DOCUMENTS

| | | |
|---|---|---|
| EP | 1489482 A3 | 7/2007 |
| EP | 1818790 A2 | 8/2007 |
| EP | 2372509 A1 | 10/2011 |
| JP | H09170947 | 6/1997 |
| KR | 20060126298 | 12/2006 |
| WO | 9511499 A1 | 4/1995 |

OTHER PUBLICATIONS

Kripa K. Varanasi. Vibration damping using low-wave-speed media with applications to precision machines. Diss. Massachusetts Institute of Technology, 2004.

Beranek et al. "The design and construction of anechoic sound chambers." The Journal of the Acoustical Society of America 18.1 (2005): 140-150.

Leland H. Hemming. Electromagnetic anechoic chambers: a fundamental design and specification guide. IEEE Press, 2002.

* cited by examiner

DAMPING VIBRATIONAL WAVE REFLECTIONS

CROSS REFERENCE TO OTHER APPLICATIONS

This application claims priority to U.S. Provisional Patent Application No. 61/888,479 entitled DAMPING VIBRATIONAL WAVE REFLECTIONS filed Oct. 8, 2013 which is incorporated herein by reference for all purposes.

BACKGROUND OF THE INVENTION

Ultrasonic waves may be used for touch location detection on a solid surface. For example, ultrasonic signals are transmitted through a medium of the touch detection surface and a disturbance of the transmitted ultrasonic signal caused by a touch input on the touch detection surface is detected (e.g., by a receiver attached to the touch input medium) to determine a location of the touch input. However, the transmitted ultrasonic signals become reflected off edges, boundaries, or other discontinuities in the touch input medium through which the ultrasonic signals travel. Much like the multipath problem experienced by wireless communications systems, these reflections will be sensed by the receiver on the touch input medium and can interfere with detection of the desired ultrasonic signal disturbed by the touch input. Typically, signal filters and other signal processing may be utilized to reduce the effects of the reflections. However, the computation required to compensate for these reflections may consume too much computation resources. Therefore, there exists a need for a more efficient way to reduce reflections.

BRIEF DESCRIPTION OF THE DRAWINGS

Various embodiments of the invention are disclosed in the following detailed description and the accompanying drawings.

DETAILED DESCRIPTION

Figure 1A:
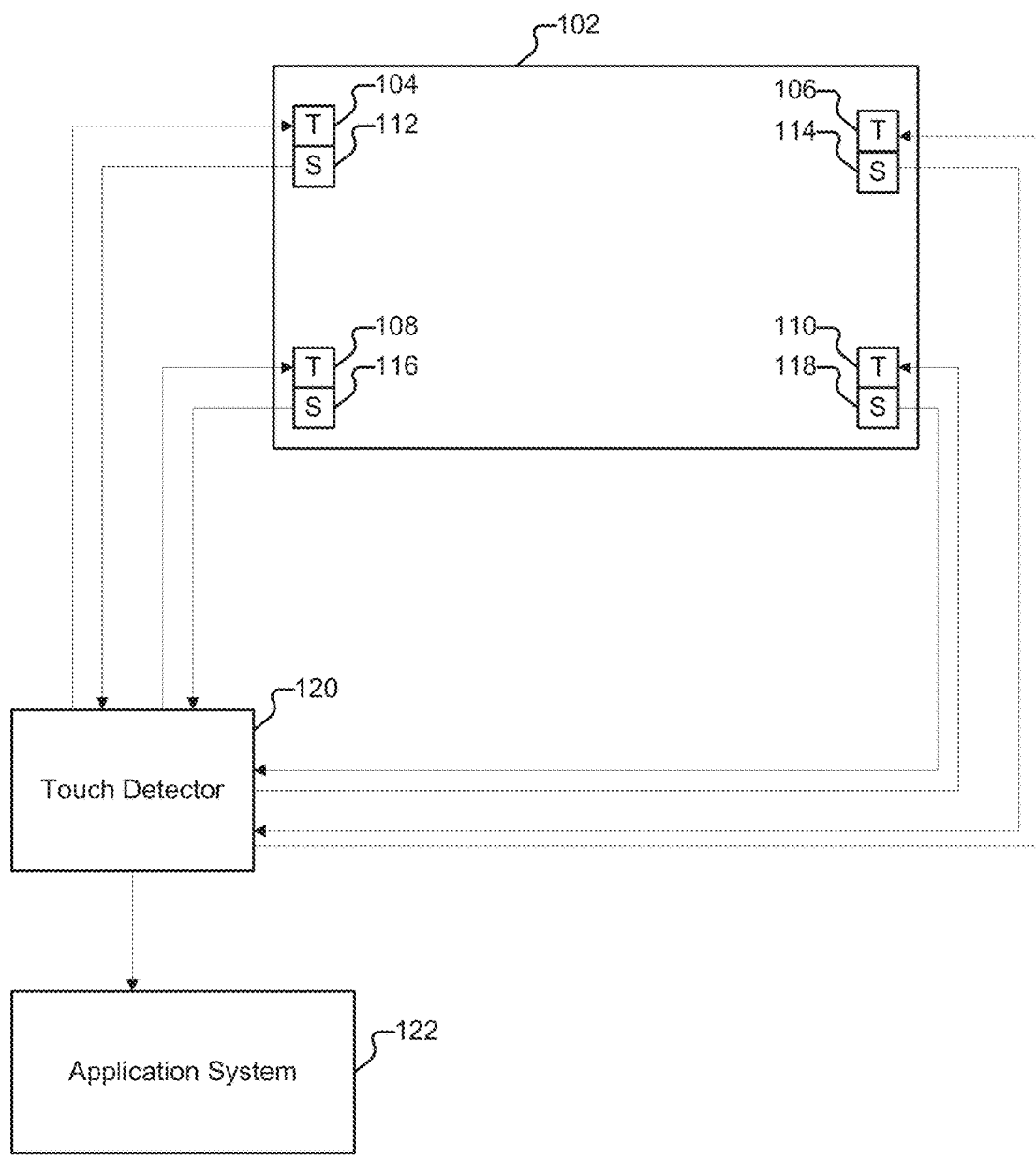
FIG. 1A is a block diagram illustrating an embodiment of a system for detecting a touch input surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a location of a touch input is detected. For example, a user touch input on a glass surface of a display screen is detected. In some embodiments, a transmitter coupled to the propagating medium emits a signal to be propagated through the propagating medium. For example, a signal such as an acoustic/ultrasonic signal is propagated freely through the propagating medium with a touch input surface from the transmitter coupled to the propagating medium. A receiver coupled to the propagating medium receives the signal from the transmitter to at least in part detect the location of the touch input as indicated by the effect of the touch input on the signal. For example, when the surface of the propagating medium is touched, the emitted signal propagating through the propagating medium is disturbed (e.g., the touch causes an interference with the propagated signal). In some embodiments, by processing the received signals and comparing each against a corresponding expected, a location on the surface associated with the touch input is at least in part determined.

A touch input detector is disclosed. In some embodiments, the detector includes an acoustic transmitter for transmitting an acoustic wave across a touch input medium. For example, a piezoelectric transducer coupled to a glass touch input screen propagates a detection signal through the glass. The detector includes an acoustic receiver for receiving the transmitted acoustic wave. The timing of the incidence of the acoustic wave on the acoustic receiver indicates at least a portion of a touch input position on a surface of the touch input medium. The detector includes an acoustic dampening material disposed around the touch input medium to dampen reflections of the transmitted acoustic wave.

When attempting to propagate signal through a medium such as glass in order to detect touch inputs on the medium, the range of frequencies that may be utilized in the transmitted signal determines the bandwidth required for the signal as well as the propagation mode of the medium excited by the signal and noise of the signal.

With respect to bandwidth, if the signal includes more frequency components than necessary to achieve a desired function, then the signal is consuming more bandwidth than necessary, leading to wasted resource consumption and slower processing times.

With respect to the propagation modes of the medium, a propagation medium such as a glass likes to propagate a signal (e.g., an ultrasonic/sonic signal) in certain propagation modes. For example, in A0 propagation mode of glass, the propagated signal travels in waves up and down, perpendicular to a surface of the glass (e.g., by bending the glass) whereas in S0 propagation mode of glass, the propagated signal travels in waves up and down parallel to the glass (e.g., by compressing and expanding the glass). A0 mode is desired over S0 mode in touch detection because a touch input contact on a glass surface disturbs the perpendicular bending wave of the A0 mode and the touch input does not significantly disturb the parallel compression waves of the S0 mode. The example glass medium has higher order propagation modes such as A1 mode and S1 mode that become excited with different frequencies of the propagated signals.

With respect to the noise of the signal, if the propagated signal is in the audio frequency range of humans, a human user would be able to hear the propagated signal that may detract from the user's user experience. If the propagated signal included frequency components that excited higher order propagation modes of the propagating medium, the signal may create undesirable noise within the propagating medium that makes detection of touch input disturbances of the propagated signal difficult to achieve.

In some embodiments, the transmitter performs spectral control of the signal. In some embodiments, performing spectral control on the signal includes controlling the frequencies included in the signal. In order to perform spectral control, a windowing function (e.g., Hanning window, raised cosine window, etc.) and/or amplitude modulation (e.g., signal sideband modulation, vestigial sideband modulation, etc.) may be utilized. In some embodiments, spectral control is performed to attempt to only excite A0 propagation mode of the propagation medium. In some embodiments, spectral control is performed to limit the frequency range of the propagated signal to be within 50 kHz to 500 kHz.

In various embodiments, the touch input includes a physical contact to a surface using a human finger, pen, pointer, stylus, and/or any other body parts or objects that can be used to contact or disturb the surface. In some embodiments, the touch input includes an input gesture and/or a multi-touch input. In some embodiments, the received signal is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

FIG. 1A is a block diagram illustrating an embodiment of a system for detecting a touch input surface disturbance. In some embodiments, the system shown in FIG. 1A is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and receivers/sensors 112, 114, 116, and 118. The locations where transmitters 104, 106, 108, and 110 and sensors 112, 114, 116, and 118 have been coupled to propagating signal medium 102, as shown in FIG. 1A, are merely an example. Other configurations of transmitter and sensor locations may exist in various embodiments. Although FIG. 1A shows sensors located adjacent to transmitters, sensors may be located apart from transmitters in other embodiments. In some embodiments, at least one transducer among one or more transducers is used as both a transmitter and a sensor. In various embodiments, the propagating medium includes one or more of the following: panel, table, glass, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1A. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducers, transmitters, sensors, and/or any other transmitters and transducers capable of propagating a signal through medium 102. Examples of sensors 112, 114, 116, and 118 include piezoelectric transducers, electromagnetic transducers, laser vibrometer transmitters, and/or any other sensors and transducers capable of detecting a signal on medium 102. In some embodiments, the transmitters and sensors shown in FIG. 1A are coupled to medium 102 in a manner that allows a user's input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitters 104, 106, 108, and 110 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 112, 114, 116, and 118 receive the propagated signals. In another embodiment, the transmitters/sensors in FIG. 1A are attached to a flexible cable coupled to medium 102 via an encapsulant and/or glue material and/or fasteners.

Touch detector 120 is connected to the transmitters and sensors shown in FIG. 1A. In some embodiments, detector 120 includes one or more of the following: an integrated circuit chip, a printed circuit board, a processor, and other electrical components and connectors. Detector 120 determines and sends signals to be propagated by transmitters 104, 106, 108, and 110. Detector 120 also receives the signals detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Figure 1B:
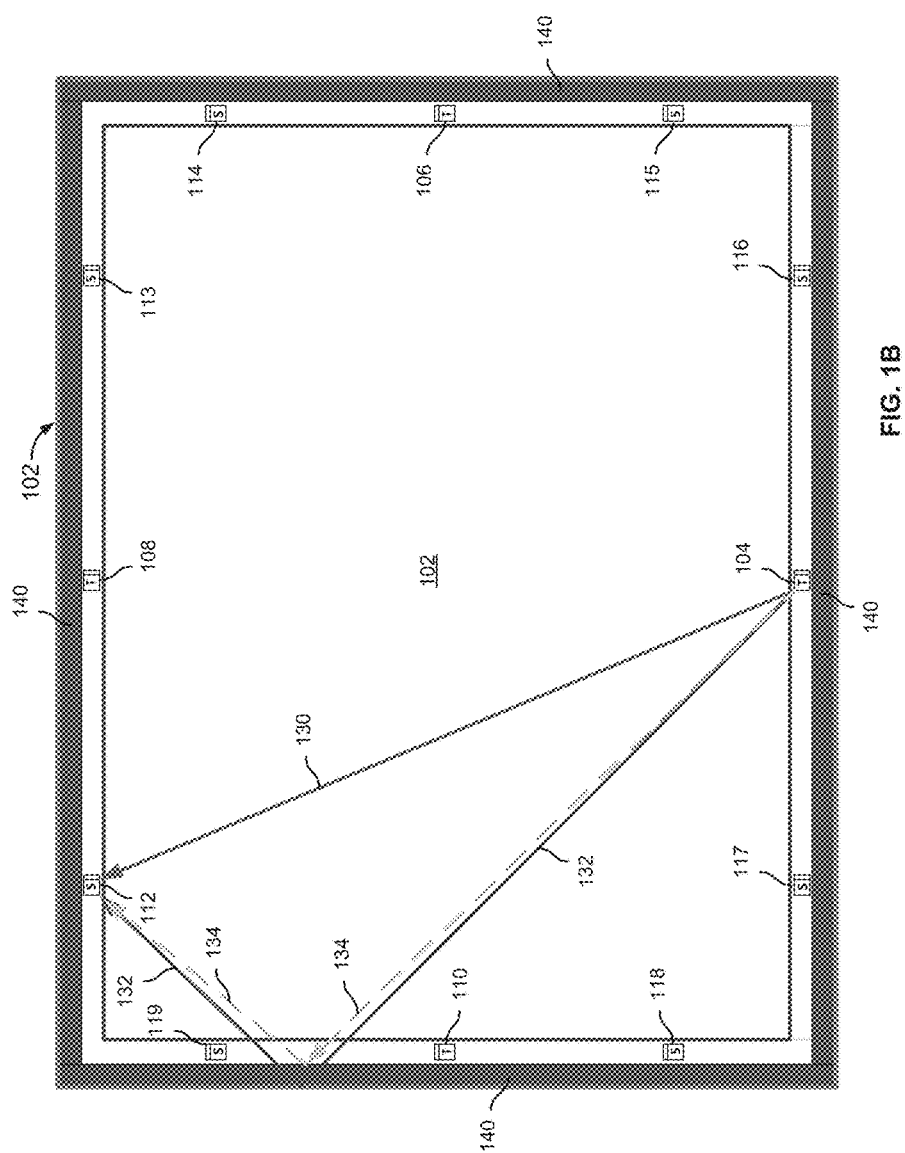
FIG. 1B is a diagram illustrating an embodiment of a system for detecting a touch input using a dampening material.

FIG. 1B is a diagram illustrating an embodiment of a system for detecting a touch input using a dampening material. FIG. 1B shows an alternative configuration of propagating signal medium 102 and the transmitters and receivers/sensors shown in FIG. 1A. In some embodiments, the system shown in FIG. 1B is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and receivers/sensors 112, 114, 116, 118, 113, 115, 117, and 119. The locations where transmitters 104, 106, 108, and 110 and sensors 112, 114, 116, 118, 113, 115, 117, and 119 have been coupled to propagating signal medium 102, as shown in FIG. 1B, are merely an example. Other configurations of transmitter and sensor locations may exist in various embodiments. In some embodiments, at least one transducer among one or more transducers is used as both a transmitter and a sensor. In various embodiments, propagating signal medium 102 includes one or more of the following: panel, table, glass, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1B. In some embodiments, the transmitters and sensors are coupled to the same surface of medium 102 where a user may touch to provide the selection input. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducers, transmitters, sensors, and/or any other transmitters and transducers capable of propagating a signal through medium 102. Examples of sensors 112, 114, 116, 118, 113, 115, 117, and 119 include piezoelectric transducers, electromagnetic transducers, laser vibrometer transmitters/sensors, and/or any other sensors and transducers capable of detecting a signal on medium 102. In some embodiments, the transmitters and sensors shown in FIG. 1B are coupled to medium 102 in a manner that allows a user's input to be detected in a predetermined region of medium 102. Although four transmitters and eight sensors are shown, any number of transmitters and any number of sensors may be used in other embodiments. For example, eight transmitters and 12 sensors may be used. In some embodiments, at least one transducer among one or more transducers acts as both a transmitter and a sensor. In the example shown, transmitters 104, 106, 108, and 110 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 112, 114, 116, 118, 113, 115, 117, and 119 receive the propagated signals. In another embodiment, the transmitters/sensors in FIG. 1B are attached to a flexible cable coupled to medium 102 via an encapsulant and/or glue material and/or fasteners. In some embodiments, one or more of transmitters 104, 106, 108, and 110 and sensors 112, 114, 116, 118, 113, 115, 117, and 119 are connected to a touch detector such as touch detector 120 of FIG. 1A. For example, wiring connects the transmitters and sensors of FIG. 1B to touch detector 120.

Trace line 130 shows a propagated signal traveling from transmitter 104 to receiver/sensor 112. In some embodiments, by detecting a disturbance in the signal received at sensor 112 from transmitter 104, a location of a touch input may be at least in part determined. However, the edges of medium 102 reflect propagated signals as well. Trace line 132 shows a propagated signal of transmitter 104 bouncing off an edge of medium 102 and being received at sensor 112. In order to distinguish a propagated signal that has been reflected/disturbed by a touch input on medium 102 from a propagated signal that has been reflected from an edge of medium 102, the system shown in FIG. 1B must compensate and/or minimize the signals reflected from edges of medium 102. In some embodiments, the system must distinguish a propagated signal that has been reflected/disturbed by a touch input on medium 102 from a propagated signal that has been reflected/disturbed by a touch input and also reflected from one or more edges of medium 102. The edge reflected signals may be filtered/compensated/removed from a signal received at a receiver/sensor using signal processing. However, the reflected signals experience attenuation and phase shifts among other signal distortions that cause the reflection reducing signal processing to be difficult and computationally expensive. FIG. 1B shows dampening material 140 surrounding medium 102. Examples of dampening material include, but are not limited to, elastomers, elastomers with one or more stiff constraining layer(s), elastomers loaded with heavy particles, adhesive tapes, and damping foam. Dampening material 140 borders the edge region of medium 102 and touches at least a portion of a surface region between one or more transmitters/sensors/receivers and one or more edges of medium 102 (e.g., 10 mm thick edge border touching surface near edges of medium 102). Dampening material 140 attenuates signals that pass through the material, reducing signals that bounce off the edges of medium 102. However, the available surface area around the border is limited and dampening material 140 can only attenuate a small portion of the undesired waves.

Damping material 140 sitting on the surface of medium 102 creates an additional discontinuity in waves traveling through medium 102 (e.g., signals propagated by one or more transmitters), and results in a portion of the wave energy reflecting off the front edge of damping material 140 as an additional unwanted multipath bounce (as shown in trace line 134). As the properties of dampening material 140 are changed to produce more attenuation (e.g., reduce reflection off the edge of medium 102 as shown in trace line 132) of the wave that passes underneath the damping material (e.g., if a heavier, more dense, material is used as dampening material 140), the discontinuity at the front edge of dampening material 140 increases, causing an undesirably larger reflected signal at the front edge of dampening material 140 (e.g., as shown in trace line 134). Therefore, there is often a limit to the net improvement that can be achieved by engineering the damping material itself. Due to the tradeoff between reducing reflections caused by an edge of medium 102 vs. an edge of dampening material 140, often a signal received at a sensor/receiver on medium 102 may still be significantly impaired by unwanted signal reflections.

Figure 1C:
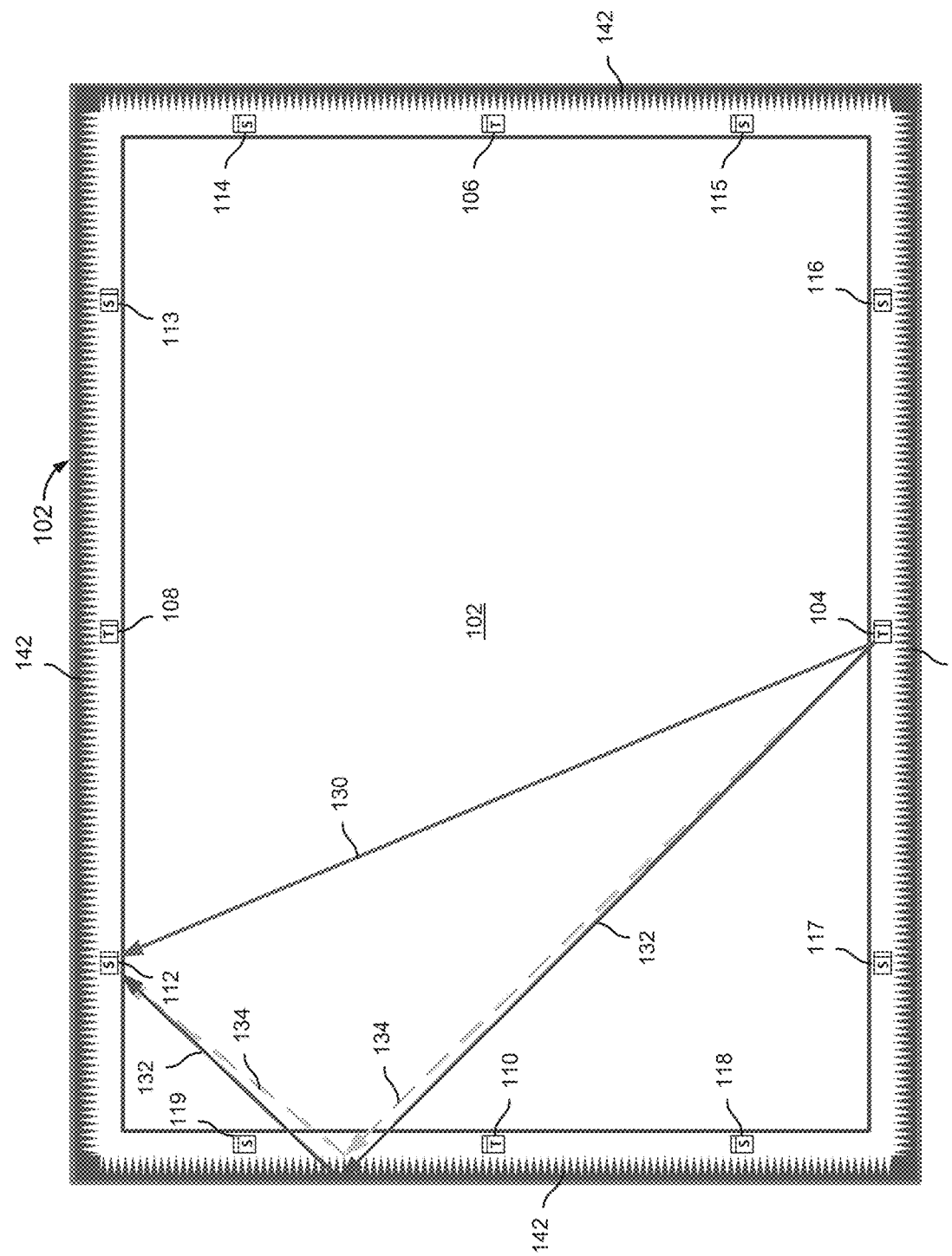
FIG. 1C is a diagram illustrating an embodiment of a shaped dampening material.

FIG. 1C is a diagram illustrating an embodiment of a shaped dampening material. FIG. 1C shows an alternative configuration of propagating signal medium 102 and the transmitters and receivers/sensors shown in FIG. 1B utilizing a differently shaped dampening material. Although four transmitters and eight sensors are shown, any number of transmitters and any number of sensors may be used in other embodiments. In some embodiments, at least one transducer among one or more transducers acts as both a transmitter and a sensor. In some embodiments, one or more of transmitters 104, 106, 108, and 110 and sensors 112, 114, 116, 118, 113, 115, 117, and 119 are connected to a touch detector such as touch detector 120 of FIG. 1A. For example, wiring connects the transmitters and sensors of FIG. 1B to touch detector 120.

FIG. 1C shows dampening material 142 surrounding medium 102. Examples of dampening material include, but are not limited to, elastomers, elastomers with one or more stiff constraining layer(s), elastomers loaded with heavy particles, adhesive tapes, and damping foam. Dampening material 142 borders the edge region of medium 102 and touches at least a portion of a surface region between one or more transmitters/ sensors/ receivers and one or more edges of medium 102. Dampening material 142 attenuates signals that pass through the material, reducing signals that bounce off the edges of medium 102. As compared to dampening material 140, an improvement may be achieved by utilizing the anechoic shape of damping material 142.

The shape of dampening material 142 may be described as anechoic, triangular, saw tooth, wedge, pyramid, etc. The tapering point ends of dampening material 142 are pointing inwards towards possible incoming signal waves. In some embodiments, the taper of the triangular shape of material 142 provides a gradual discontinuity for the signal waves as they travel from the tips (where there is a small amount of damping material) down towards the base of the triangular shape (where there is more damping material). This more gradual discontinuity may result in a reduced signal reflection off the front edge of the damping material border. This may be especially helpful if a high-attenuation (e.g., high acoustical impedance) material is utilized as dampening material that works well to attenuate the reflection off the edge of medium 102, but creates a significant reflection off the front edge of the dampening material.

In some embodiments, tapering of the attenuation property (e.g., acoustical impedance) may be utilized in any shaped dampening material such as dampening material 140 of FIG. 1B. For example, the thickness and/or material properties (e.g., density) of dampening material 140 may be thinner/lighter/less-dense closer to the center of medium 102 than it is at the edge of the medium 102. In some embodiments, the thickness and/or material properties (e.g., density) of a shaped dampening material such as dampening material 142 may be thinner/lighter/less-dense closer to the center of medium 102 than it is at the edge of the medium 102. For example, uniform thickness dampening material that is denser towards the edge closest to the edge of medium 102 and less dense towards the inner edge of the dampening material closest to the center of medium 102 is utilized. In some embodiments, the attenuation property (e.g., acoustical impedance) of the dampening material (e.g., material 140 or 142) may be varied by compressing the dampening material by varying amounts (e.g., clamp dampening material against medium 102 using an anechoic/taper shape clamp). In some embodiments, the attenuation property of the dampening material may be non-homogeneously (e.g., gradually, discrete steps, "stair-stepped," etc.) varied (e.g., from the edge closest to edge of medium 102 to the inner edge of the dampening material closest to the center of medium 102 to provide increasing discontinuity). In various embodiments, the thickness and/or material properties (e.g., density) of a dampening material may be varied in any of the three dimensional directions (e.g., varied in any of one or more x, y, and/or z directions).

Figure 1D:
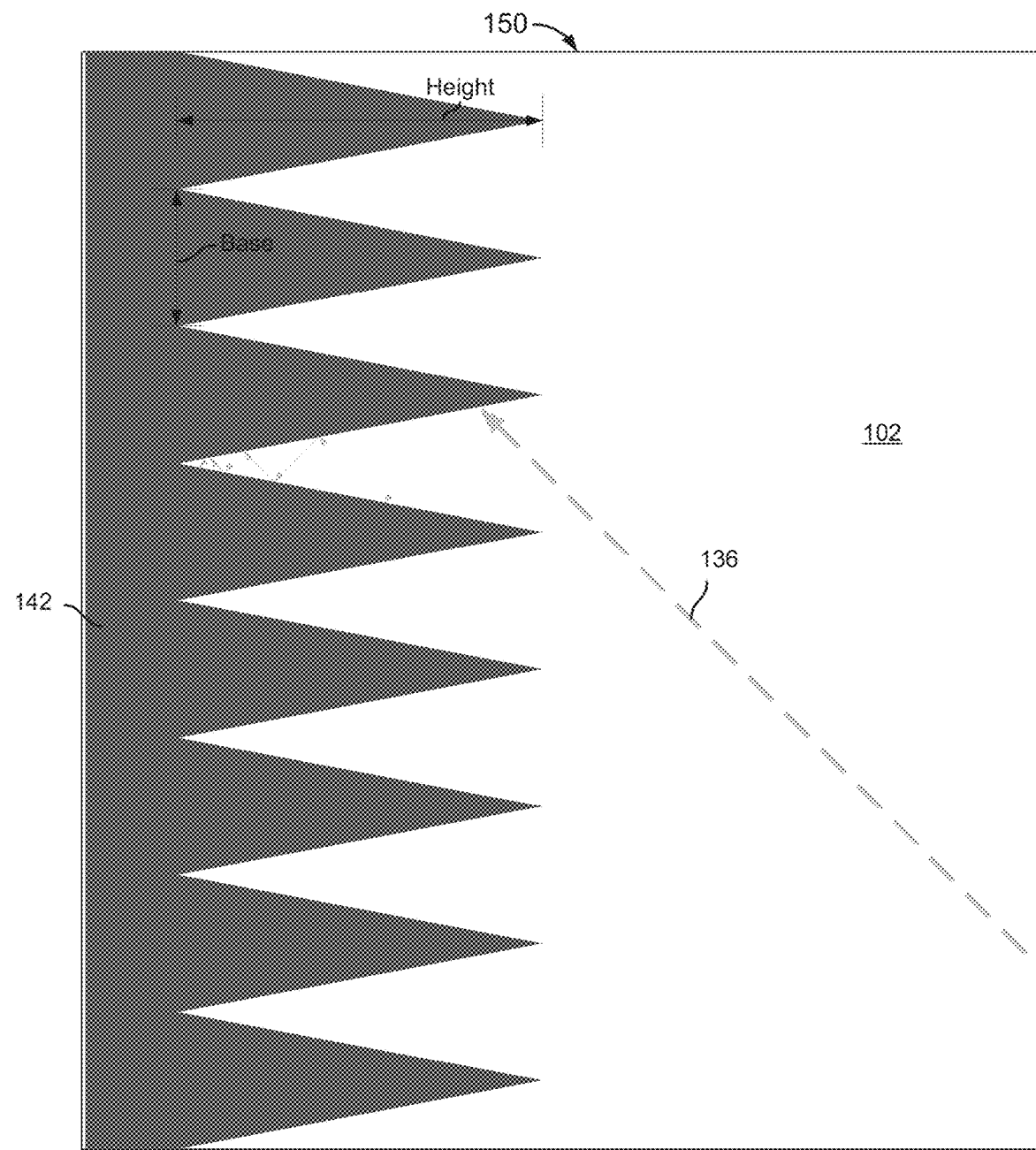
FIG. 1D is a diagram illustrating a magnified view of the embodiment shown in FIG. 1C.

FIG. 1D is a diagram illustrating a magnified view of the embodiment shown in FIG. 1C. View window 150 shows a magnified view of anechoic protrusions (e.g., triangular wedges) of dampening material 142 shown in FIG. 1C. Signals traveling through a propagating medium (e.g., propagating medium 102) that reflect off an edge of the triangular wedges of dampening material 142 will bounce immediately into an adjacent "tooth" where the signal wave is further attenuated and trapped. Trace line 136 shows a signal bouncing between the triangular wedges of dampening material 142 (being attenuated with each bounce) and becoming almost completely eliminated by dampening material 142. In some embodiments, the height of each anechoic protrusion (e.g., each triangular "tooth") of the shape of dampening material 142 is configured to be larger than the width of the base (e.g., height of each triangular "tooth" is at least 2.5 times the width of the base of the triangular "tooth") so that by Snell's Law (i.e., angle of incidence=angle of reflection), any incident signal wave must bounce multiple times between the two triangular regions before exiting the damping material. FIG. 1D labels the height and base width of two different anechoic protrusions. The trapping of a reflected signal in between anechoic protrusions of the dampening material may be effective at higher frequencies where the wavelength is small compared to the separation between the anechoic protrusions. In some embodiments, the height of each anechoic protrusion (e.g., each triangular "tooth") of dampening material 142 is configured to be larger than ¼ of the wavelength of the largest wavelength of a signal desired to be attenuated by the dampening material. Thus the shaping of dampening material 142 enables both (1) the gradual tapering of its attenuation property (e.g., acoustical impedance) to reduce reflections and (2) trap reflections between anechoic protrusions by reflecting signals between anechoic protrusions.

In some embodiments, adhesive material may be utilized to create shape or taper (e.g., use a straight strip of damping material, but apply the adhesive between the dampening material and signal propagation medium in an anechoic "saw tooth" pattern shape) of the dampening material. In some embodiments, the signal propagation medium (e.g., surface of medium 102) is etched utilizing an anechoic shape and attached to a dampening material. In some embodiments, at least a portion of a dampening material such as dampening material 142 is parabolic, exponential, and/or logarithmic in shape. For example, dampening material 142 is shaped to include one or more parabolic, exponential, or logarithmic taper teeth/wedge protrusions.

Figure 2:
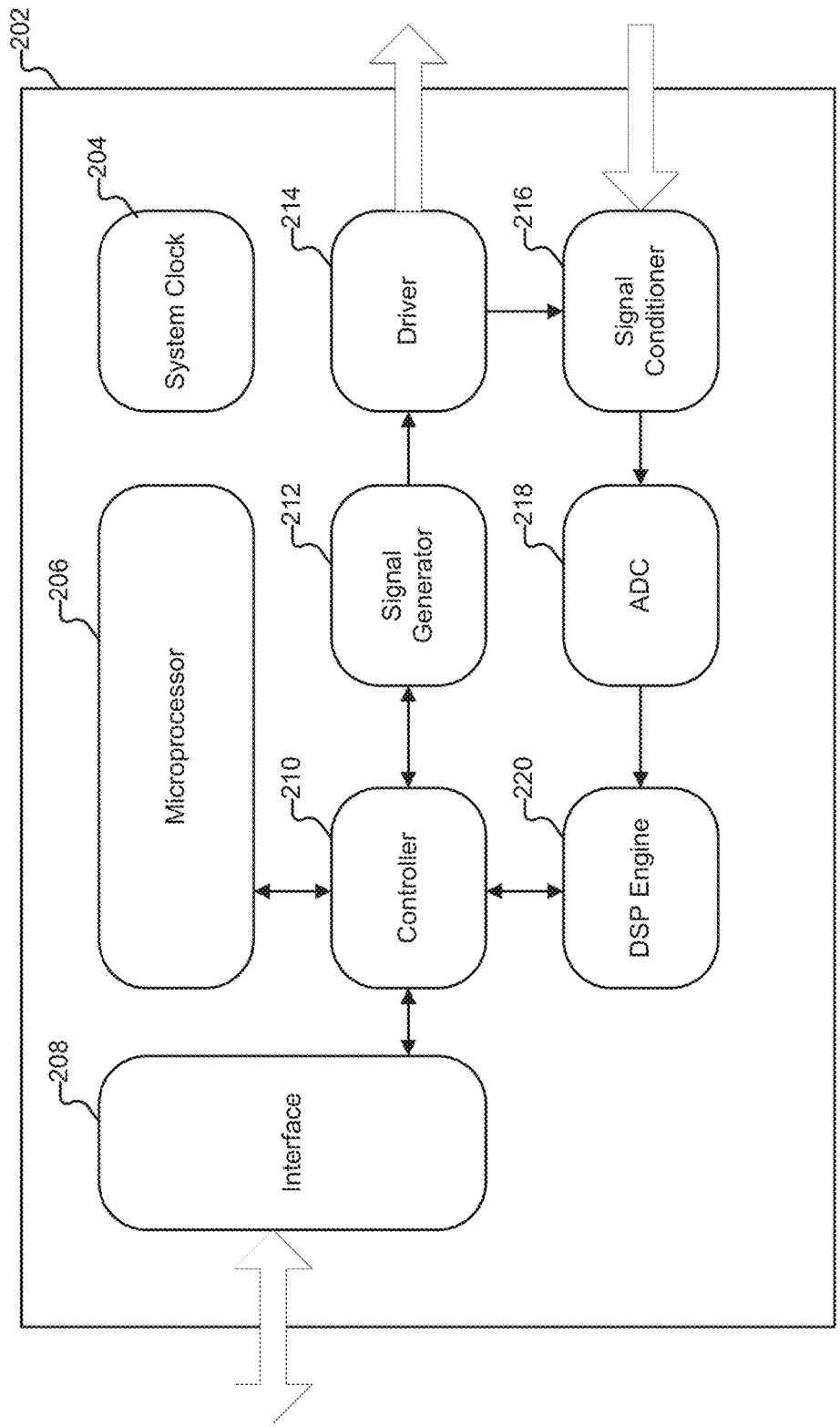
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1A. In various embodiments, one or more transmitters and/or receivers/sensors of FIGS. 1A-1D are connected to touch detector 202. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions.

Signal generator 212 generates signals to be used to propagate signals such as signals propagated by transmitters 104, 106, 108, and 110 of FIGS. 1A-1D. For example, signal generator 212 generates pseudorandom binary sequence signals that are converted from digital to analog signals. Different signals (e.g., a different signal for each transmitter) may be generated by signal generator 212 by varying a phase of the signals (e.g., code division multiplexing), a frequency range of the signals (e.g., frequency division multiplexing), or a timing of the signals (e.g., time division multiplexing). In some embodiments, spectral control (e.g., signal frequency range control) of the signal generated by signal generator 212 is performed. For example, microprocessor 206, DSP engine 220, and/or signal generator 212 determines a windowing function and/or amplitude modulation to be utilized to control the frequencies of the signal generated by signal generator 212. Examples of the windowing function include a Hanning window and raised cosine window. Examples of the amplitude modulation include signal sideband modulation and vestigial sideband modulation. In some embodiments, the determined windowing function may be utilized by signal generator 212 to generate a signal to be modulated to a carrier frequency. The carrier frequency may be selected such that the transmitted signal is an ultrasonic signal. For example, the transmitted signal to be propagated through a propagating medium is desired to be an ultrasonic signal to minimize undesired interference with sonic noise and minimize excitation of undesired propagation modes of the propagating medium. The modulation of the signal may be performed using a type of amplitude modulation such as signal sideband modulation and vestigial sideband modulation to perform spectral of the signal. The modulation may be performed by signal generator 212 and/or driver 214. Driver 214 receives the signal from generator 212 and drives one or more transmitters, such as transmitters 104, 106, 108, and 110 of FIGS. 1A-1D, to propagate signals through a medium.

A signal detected from a sensor such as sensor 112 of FIGS. 1A-1D is received by detector 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 separates components corresponding to different signals propagated by different transmitters from the received signal and each component is correlated against a reference signal. The result of the correlation may be used by microprocessor 206 to determine a location associated with a user touch input. For example, microprocessor 206 compares relative differences of disturbances detected in signals originating from different transmitters and/or received at different receivers/sensors to determine the location.

In some embodiments, DSP engine 220 correlates the converted signal against a reference signal to determine a time domain signal that represents a time delay caused by a touch input on a propagated signal. In some embodiments, DSP engine 220 performs dispersion compensation. For example, the time delay signal that results from correlation is compensated for dispersion in the touch input surface medium and translated to a spatial domain signal that represents a physical distance traveled by the propagated signal disturbed by the touch input. In some embodiments, DSP engine 220 performs base pulse correlation. For example, the spatial domain signal is filtered using a match filter to reduce noise in the signal. A result of DSP engine 220 may be used by microprocessor 206 to determine a location associated with a user touch input. For example, microprocessor 206 determines a hypothesis location where a touch input may have been received and calculates an expected signal that is expected to be generated if a touch input was received at the hypothesis location and the expected signal is compared with a result of DSP engine 220 to determine whether a touch input was provided at the hypothesis location.

Interface 208 provides an interface for microprocessor 206 and controller 210 that allows an external component to access and/or control detector 202. For example, interface 208 allows detector 202 to communicate with application system 122 of FIG. 1A and provides the application system with location information associated with a user touch input.

Figure 3:
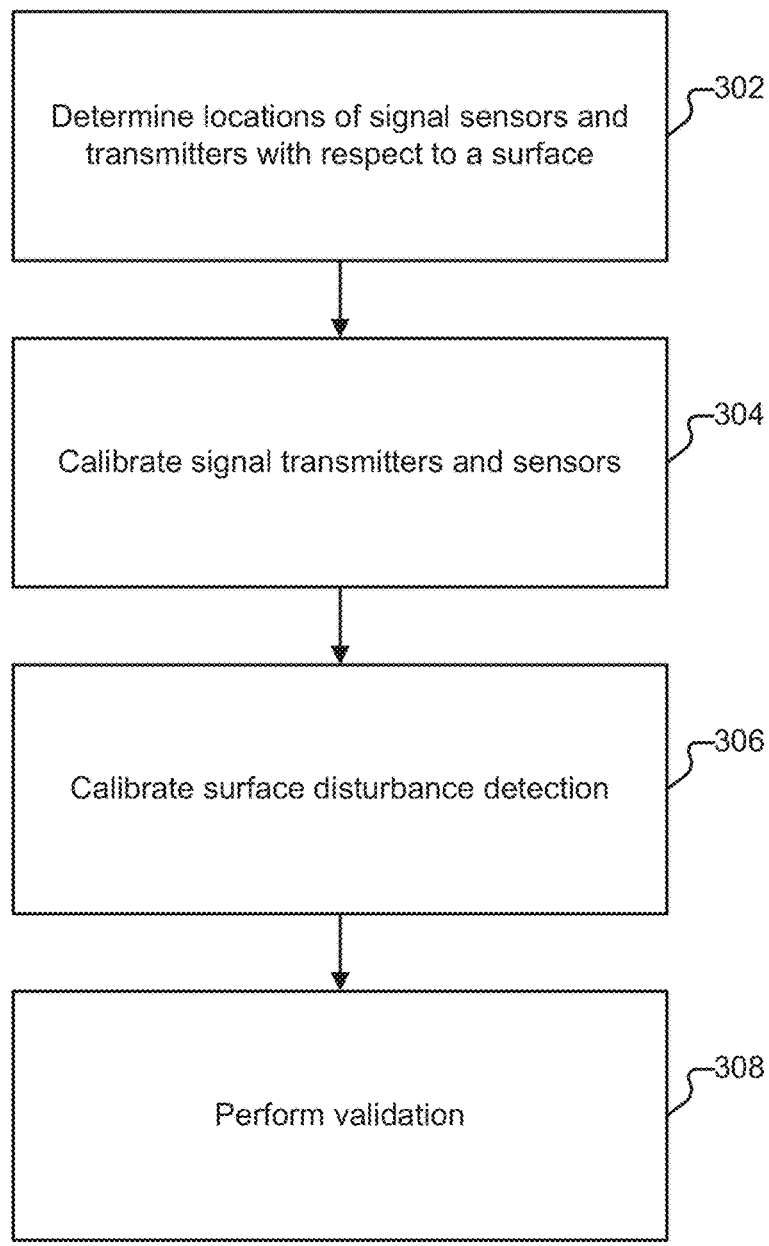
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the systems of FIGS. 1A-1D and/or the system of FIG. 2. At 302, locations of signal transmitters and sensors with respect to a surface are determined. For example, locations of transmitters and sensors shown in FIGS. 1A-1D are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-to-noise transmission/detection of a signal (e.g., acoustic or ultrasonic) to be propagated through a medium and/or a disturbance to be detected. For example, one or more components of the systems of FIGS. 1A-1D and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selected portion of the predetermined spatial region.

At 306, surface disturbance detection is calibrated. In some embodiments, a test signal is propagated through a medium such as medium 102 of FIGS. 1A-1D to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection. In some embodiments, the test signal is used to determine a signal that can be later used to process/filter a detected signal disturbed by a touch input.

In some embodiments, data determined using one or more steps of FIG. 3 is used to determine data (e.g., formula, variable, coefficients, etc.) that can be used to calculate an expected signal that would result when a touch input is provided at a specific location on a touch input surface. For example, one or more predetermined test touch disturbances are applied at one or more specific locations on the touch input surface and a test propagating signal that has been disturbed by the test touch disturbance is used to determine the data (e.g., transmitter/sensor parameters) that is to be used to calculate an expected signal that would result when a touch input is provided at the one or more specific locations.

At 308, a validation of a touch detection system is performed. For example, the systems of FIGS. 1A-1D and/or FIG. 2 is tested using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
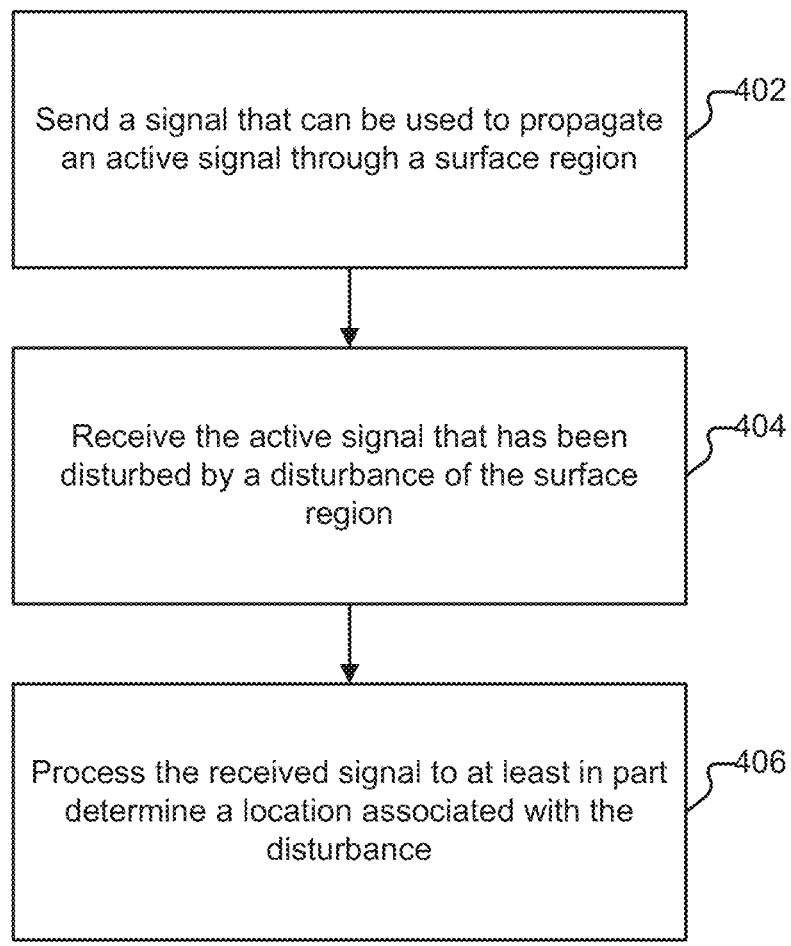
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1A and/or touch detector 202 of FIG. 2.

At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1A) to propagate an active signal (e.g., acoustic or ultrasonic) through a propagating medium with the surface region. In some embodiments, the signal includes a sequence selected to optimize autocorrelation (e.g., resulting in narrow/short peaks) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

When attempting to propagate signal through a medium such as glass in order to detect touch inputs on the medium, the range of frequencies that may be utilized in the transmitted signal determines the bandwidth required for the signal as well as the propagation mode of the medium excited by the signal and noise of the signal.

With respect to bandwidth, if the signal includes more frequency components than necessary to achieve a desired function, then the signal is consuming more bandwidth than necessary, leading to wasted resource consumption and slower processing times.

With respect to the propagation modes of the medium, a propagation medium such as a glass likes to propagate a signal (e.g., an ultrasonic/sonic signal) in certain propagation modes. For example, in the A0 propagation mode of glass the propagated signal travels in waves up and down perpendicular to a surface of the glass (e.g., by bending the glass) whereas in the S0 propagation mode of glass the propagated signal travels in waves up and down parallel to the glass (e.g., by compressing and expanding the glass). A0 mode is desired over S0 mode in touch detection because a touch input contact on a glass surface disturbs the perpendicular bending wave of the A0 mode and the touch input does not significantly disturb the parallel compression waves of the S0 mode. The example glass medium has higher order propagation modes such as A1 mode and S1 mode that become excited with different frequencies of the propagated signals.

With respect to the noise of the signal, if the propagated signal is in the audio frequency range of humans, a human user would be able to hear the propagated signal and may detract from the user's user experience. If the propagated signal included frequency components that excited higher order propagation modes of the propagating medium, the signal may create undesirable noise within the propagating medium that makes detection of touch input disturbances of the propagated signal difficult to achieve.

In some embodiments, the sending the signal includes performing spectral control of the signal. In some embodiments, performing spectral control on the signal includes controlling the frequencies included in the signal. In order to perform spectral control, a windowing function (e.g., Hanning window, raised cosine window, etc.) and/or amplitude modulation (e.g., signal sideband modulation, vestigial sideband modulation, etc.) may be utilized. In some embodiments, spectral control is performed to attempt to only excite A0 propagation mode of the propagation medium. In some embodiments, spectral control is performed to limit the frequency range of the propagated signal to be within 50 kHz to 250 kHz.

In some embodiments, the sent signal includes a pseudorandom binary sequence. The binary sequence may be represented using a square pulse. However, modulated signal of the square pulse includes a wide range of frequency components due to the sharp square edges of the square pulse. In order to efficiently transmit the pseudorandom binary sequence, it is desirable to "smooth out" sharp edges of the binary sequence signal by utilizing a shaped pulse. A windowing function may be utilized to "smooth out" the sharp edges and reduce the frequency range of the signal. A windowing function such as Hanning window and/or raised cosine window may be utilized. In some embodiments, the type and/or one or more parameters of the windowing function is determined based at least in part on a property of a propagation medium such as medium 102 of FIGS. 1A-1D. For example, information about propagation modes and associated frequencies of the propagation medium are utilized to select the type and/or parameter(s) of the windowing function (e.g., to excite desired propagation mode and not excite undesired propagation mode). In some embodiments, a type of propagation medium is utilized to select the type and/or parameter(s) of the windowing function. In some embodiments, a dispersion coefficient, a size, a dimension, and/or a thickness of the propagation medium is utilized to select the type and/or parameter(s) of the windowing function. In some embodiments, a property of a transmitter is utilized to select the type and/or parameter(s) of the windowing function.

In some embodiments, sending the signal includes modulating (e.g., utilize amplitude modulation) the signal. For example, the desired baseband signal (e.g., a pseudorandom binary sequence signal) is desired to be transmitted at a carrier frequency (e.g., ultrasonic frequency). In this example, the amplitude of the signal at the carrier frequency may be varied to send the desired baseband signal (e.g., utilizing amplitude modulation). However, traditional amplitude modulation (e.g., utilizing double-sideband modulation) produces an output signal that has twice the frequency bandwidth of the original baseband signal. Transmitting this output signal consumes resources that otherwise do not have to be utilized. In some embodiments, single-sideband modulation is utilized. In some embodiments, in single-sideband modulation, the output signal utilizes half of the frequency bandwidth of double-sideband modulation by not utilizing a redundant second sideband included in the double-sideband modulated signal. In some embodiments, vestigial sideband modulation is utilized. For example, a portion of one of the redundant sidebands is effectively removed from a corresponding double-sideband modulated signal to form a vestigial sideband signal. In some embodiments, double-sideband modulation is utilized.

In some embodiments, sending the signal includes determining the signal to be transmitted by a transmitter such that the signal is distinguishable from other signal(s) transmitted by other transmitters. In some embodiments, sending the signal includes determining a phase of the signal to be transmitted (e.g., utilize code division multiplexing/CDMA). For example, an offset within a pseudorandom binary sequence to be transmitted is determined. In this example, each transmitter (e.g., transmitters 104, 106, 108, and 110 of FIGS. 1A-1D) transmits a signal with the same pseudorandom binary sequence but with a different phase/offset. The signal offset/phase difference between the signals transmitted by the transmitters may be equally spaced (e.g., 64-bit offset for each successive signal) or not equally spaced (e.g., different offset signals). The phase/offset between the signals may be selected such that it is long enough to reliably distinguish between different signals transmitted by different transmitters. In some embodiments, the signal is selected such that the signal is distinguishable from other signals transmitted and propagated through the medium. In some embodiments, the signal is selected such that the signal is orthogonal to other signals (e.g., each signal orthogonal to each other) transmitted and propagated through the medium.

In some embodiments, sending the signal includes determining a frequency of the signal to be transmitted (e.g., utilize frequency division multiplexing/FDMA). For example, a frequency range to be utilized for the signal is determined. In this example, each transmitter (e.g., transmitters 104, 106, 108, and 110 of FIGS. 1A-1D) transmits a signal in a different frequency range as compared to signals transmitted by other transmitters. The range of frequencies that can be utilized by the signals transmitted by the transmitters is divided among the transmitters. In some cases if the range of frequencies that can be utilized by the signals is small, it may be difficult to transmit all of the desired different signals of all the transmitters. Thus the number of transmitters that can be utilized with frequency division multiplexing/FDMA may be smaller than can be utilized with code division multiplexing/CDMA.

In some embodiments, sending the signal includes determining a timing of the signal to be transmitted (e.g., utilize time division multiplexing/TDMA). For example, a time when the signal should be transmitted is determined. In this example, each transmitter (e.g., transmitters 104, 106, 108, and 110 of FIGS. 1A-1D) transmits a signal in different time slots as compared to signals transmitted by other transmitters. This may allow the transmitters to transmit signals in a round-robin fashion such that only one transmitter is emitting/transmitting at one time. A delay period may be inserted between periods of transmission of different transmitters to allow the signal of the previous transmitter to sufficiently dissipate before transmitting a new signal of the next transmitter. In some cases, time division multiplexing/TDMA may be difficult to utilize in cases where fast detection of touch input is desired because time division multiplexing/TDMA slows down the speed of transmission/detection as compared to code division multiplexing/CDMA.

At 404, the active signal that has been disturbed by a disturbance of the surface region is received. The disturbance may be associated with a user touch indication. In some embodiments, the disturbance causes the active signal that is propagating through a medium to be attenuated and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, components of the received signal associated with different signals of different transmitters are separated. For example, different signals originating from different transmitters are isolated from other signals of other transmitters for individual processing. In some embodiments, determining the location includes comparing at least a portion of the received signal (e.g., signal component from a single transmitter) to a reference signal (e.g., reference signal corresponding to the transmitter signal) that has not been affected by the disturbance. The result of the comparison may be used with a result of other comparisons performed using the reference signal and other signal(s) received at a plurality of sensors.

In some embodiments, receiving the received signal and processing the received signal are performed on a periodic interval. For example, the received signal is captured in 5 ms intervals and processed. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes processing the received signal and comparing the processed received signal with a calculated expected signal associated with a hypothesis touch contact location to determine whether a touch contact was received at the hypothesis location of the calculated expected signal. Multiple comparisons may be performed with various expected signals associated with different hypothesis locations until the expected signal that best matches the processed received signal is found and the hypothesis location of the matched expected signal is identified as the touch contact location(s) of a touch input. For example, signals received by sensors (e.g., sensors 112, 114, 116, 118, 113, 115, 117, and/or 119 of FIGS. 1A-1D) from various transmitters (e.g., transmitters 104, 106, 108, and 110 of FIGS. 1A-1D) are compared with corresponding expected signals to determine a touch input location (e.g., single or multi-touch locations) that minimizes the overall difference between all respective received and expected signals.

The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
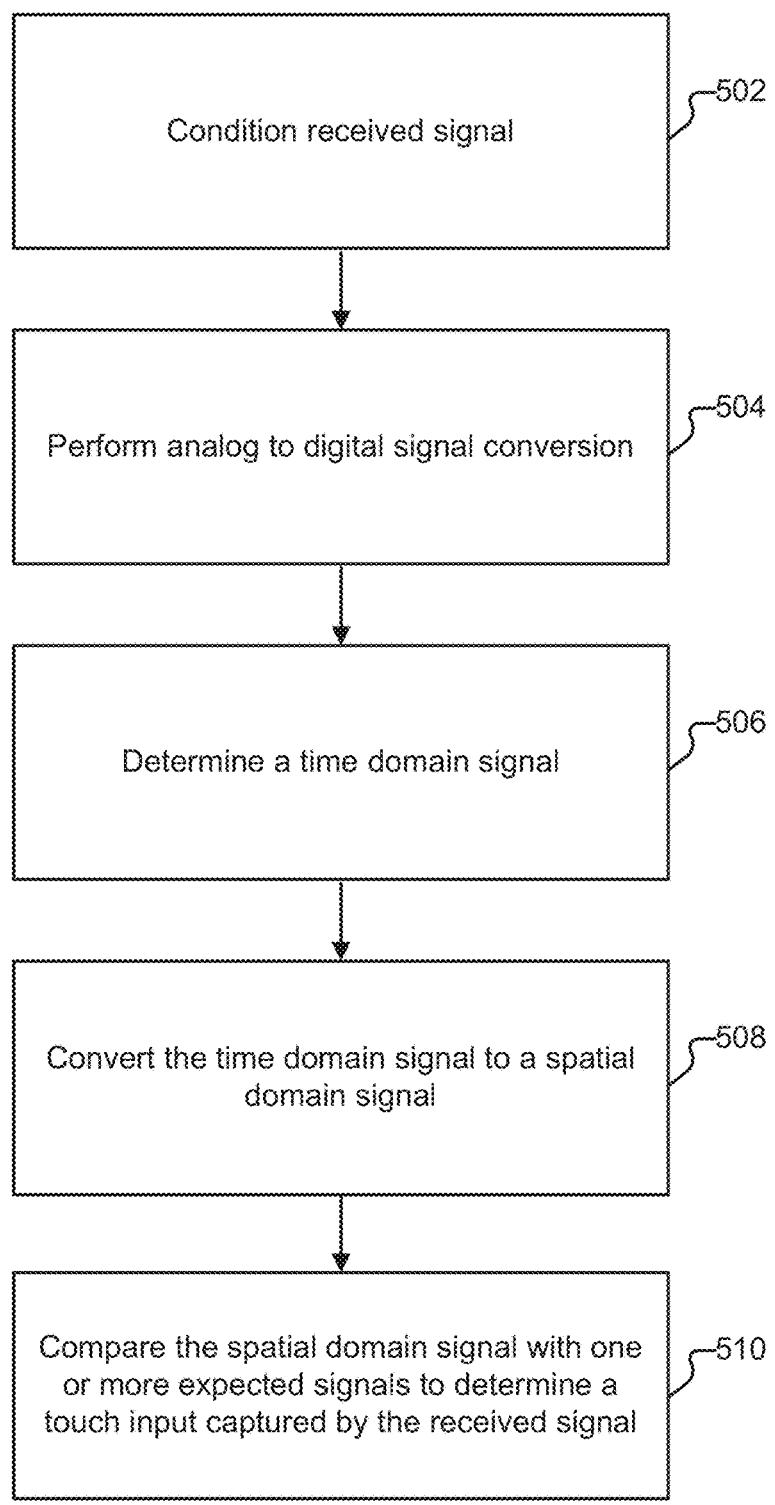
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1A and/or touch detector 202 of FIG. 2. In some embodiments, at least a portion of the process of FIG. 5 is repeated for each combination of transmitter and sensor pair. For example, for each active signal transmitted by a transmitter (e.g., transmitted by transmitter 104, 106, 108, or 110 of FIGS. 1A-1D), at least a portion of the process of FIG. 5 is repeated for each sensor (e.g., sensors 112, 114, 116, 118, 113, 115, 117, and/or 119 of FIGS. 1A-1D) receiving the active signal. In some embodiments, the process of FIG. 5 is performed periodically (e.g., 5 ms periodic interval).

At 502, a received signal is conditioned. In some embodiments, the received signal is a signal including a pseudo-random binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used.

At 506, a time domain signal capturing a received signal time delay caused by a touch input disturbance is determined. In some embodiments, determining the time domain signal includes correlating the received signal (e.g., signal resulting from 504) to locate a time offset in the converted signal (e.g., perform pseudorandom binary sequence deconvolution) where a signal portion that likely corresponds to a reference signal (e.g., reference pseudorandom binary sequence that has been transmitted through the medium) is located. For example, a result of the correlation can be plotted as a graph of time within the received and converted signal (e.g., time-lag between the signals) vs. a measure of similarity. In some embodiments, performing the correlation includes performing a plurality of correlations. For example, a coarse correlation is first performed then a second level of fine correlation is performed. In some embodiments, a baseline signal that has not been disturbed by a touch input disturbance is removed in the resulting time domain signal. For example, a baseline signal (e.g., determined at 306 of FIG. 3) representing a measured signal (e.g., a baseline time domain signal) associated with a received active signal that has not been disturbed by a touch input disturbance is subtracted from a result of the correlation to further isolate effects of the touch input disturbance by removing components of the steady state baseline signal not affected by the touch input disturbance.

At 508, the time domain signal is converted to a spatial domain signal. In some embodiments, converting the time domain signal includes converting the time domain signal determined at 506 into a spatial domain signal that translates the time delay represented in the time domain signal to a distance traveled by the received signal in the propagating medium due to the touch input disturbance. For example, a time domain signal that can be graphed as time within the received and converted signal vs. a measure of similarity is converted to a spatial domain signal that can be graphed as distance traveled in the medium vs. the measure of similarity.

In some embodiments, performing the conversion includes performing dispersion compensation. For example, using a dispersion curve characterizing the propagating medium, time values of the time domain signal are translated to distance values in the spatial domain signal. In some embodiments, a resulting curve of the time domain signal representing a distance likely traveled by the received signal due to a touch input disturbance is narrower than the curve contained in the time domain signal representing the time delay likely caused by the touch input disturbance. In some embodiments, the time domain signal is filtered using a match filter to reduce undesired noise in the signal. For example, using a template signal that represents an ideal shape of a spatial domain signal, the converted spatial domain signal is match filtered (e.g., spatial domain signal correlated with the template signal) to reduce noise not contained in the bandwidth of the template signal. The template signal may be predetermined (e.g., determined at 306 of FIG. 3) by applying a sample touch input to a touch input surface and measuring a received signal.

At 510, the spatial domain signal is compared with one or more expected signals to determine a touch input captured by the received signal. In some embodiments, comparing the spatial domain signal with the expected signal includes generating expected signals that would result if a touch contact was received at hypothesis locations. For example, a hypothesis set of one or more locations (e.g., single touch or multi-touch locations) where a touch input might have been received on a touch input surface is determined, and an expected spatial domain signal that would result at 508 if touch contacts were received at the hypothesis set of location(s) is determined (e.g., determined for a specific transmitter and sensor pair using data measured at 306 of FIG. 3). The expected spatial domain signal may be compared with the actual spatial signal determined at 508. The hypothesis set of one or more locations may be one of a plurality of hypothesis sets of locations (e.g., exhaustive set of possible touch contact locations on a coordinate grid dividing a touch input surface).

The proximity of location(s) of a hypothesis set to the actual touch contact location(s) captured by the received signal may be proportional to the degree of similarity between the expected signal of the hypothesis set and the spatial signal determined at 508. In some embodiments, signals received by sensors (e.g., sensors 112, 114, 116, 118, 113, 115, 117, and/or 119 of FIGS. 1A-1D) from transmitters (e.g., transmitters 104, 106, 108, and 110 of FIGS. 1A-1D) are compared with corresponding expected signals for each sensor/transmitter pair to select a hypothesis set that minimizes the overall difference between all respective detected and expected signals. In some embodiments, once a hypothesis set is selected, another comparison between the determined spatial domain signals and one or more new expected signals associated with finer resolution hypothesis touch location(s) (e.g., locations on a new coordinate grid with more resolution than the coordinate grid used by the selected hypothesis set) near the location(s) of the selected hypothesis set is determined.

Figure 6:
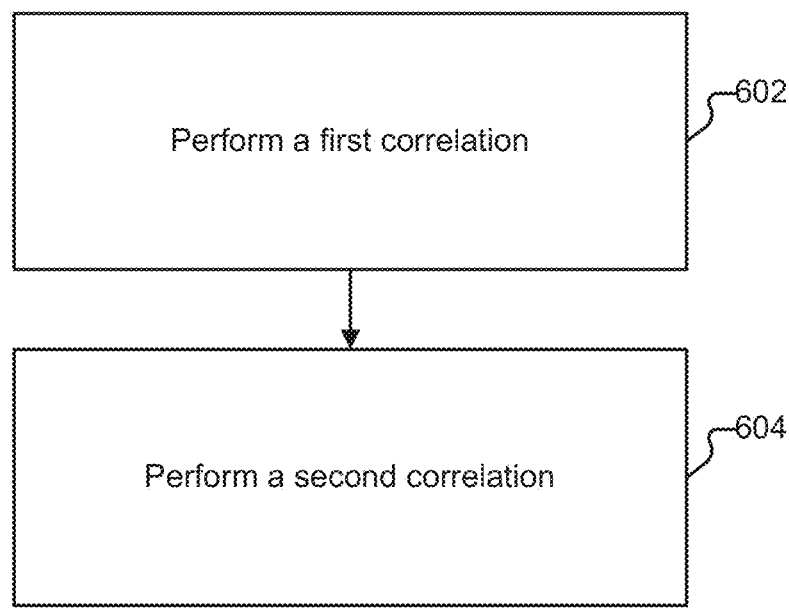
FIG. 6 is a flow chart illustrating an embodiment of a process for determining time domain signal capturing of a disturbance caused by a touch input.

FIG. 6 is a flow chart illustrating an embodiment of a process for determining time domain signal capturing of a disturbance caused by a touch input. In some embodiments, the process of FIG. 6 is included in 506 of FIG. 5. The process of FIG. 6 may be implemented in touch detector 120 of FIG. 1A and/or touch detector 202 of FIG. 2.

At 602, a first correlation is performed. In some embodiments, performing the first correlation includes correlating a received signal (e.g., resulting converted signal determined at 504 of FIG. 5) with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a force associated with a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal is a simplified reference signal that can be used to efficiently correlate the reference signal over a relatively large time difference (e.g., lag-time) between the received and converted signal and the reference signal.

At 604, a second correlation is performed based on a result of the first correlation. Performing the second correlation includes correlating (e.g., cross-correlation or convolution similar to step 602) a received signal (e.g., resulting converted signal determined at 504 of FIG. 5) with a second reference signal. The second reference signal is a more complex/detailed (e.g., more computationally intensive) reference signal as compared to the first reference signal used in 602. In some embodiments, the second correlation is performed because using the second reference signal in 602 may be too computationally intensive for the time interval required to be correlated in 602. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to a disturbance caused by a touch input at a location on a surface of a propagating medium. In other embodiments, the second correlation is optional. For example, only a single correlation step is performed. Any number of levels of correlations may be performed in other embodiments.

Figure 7:
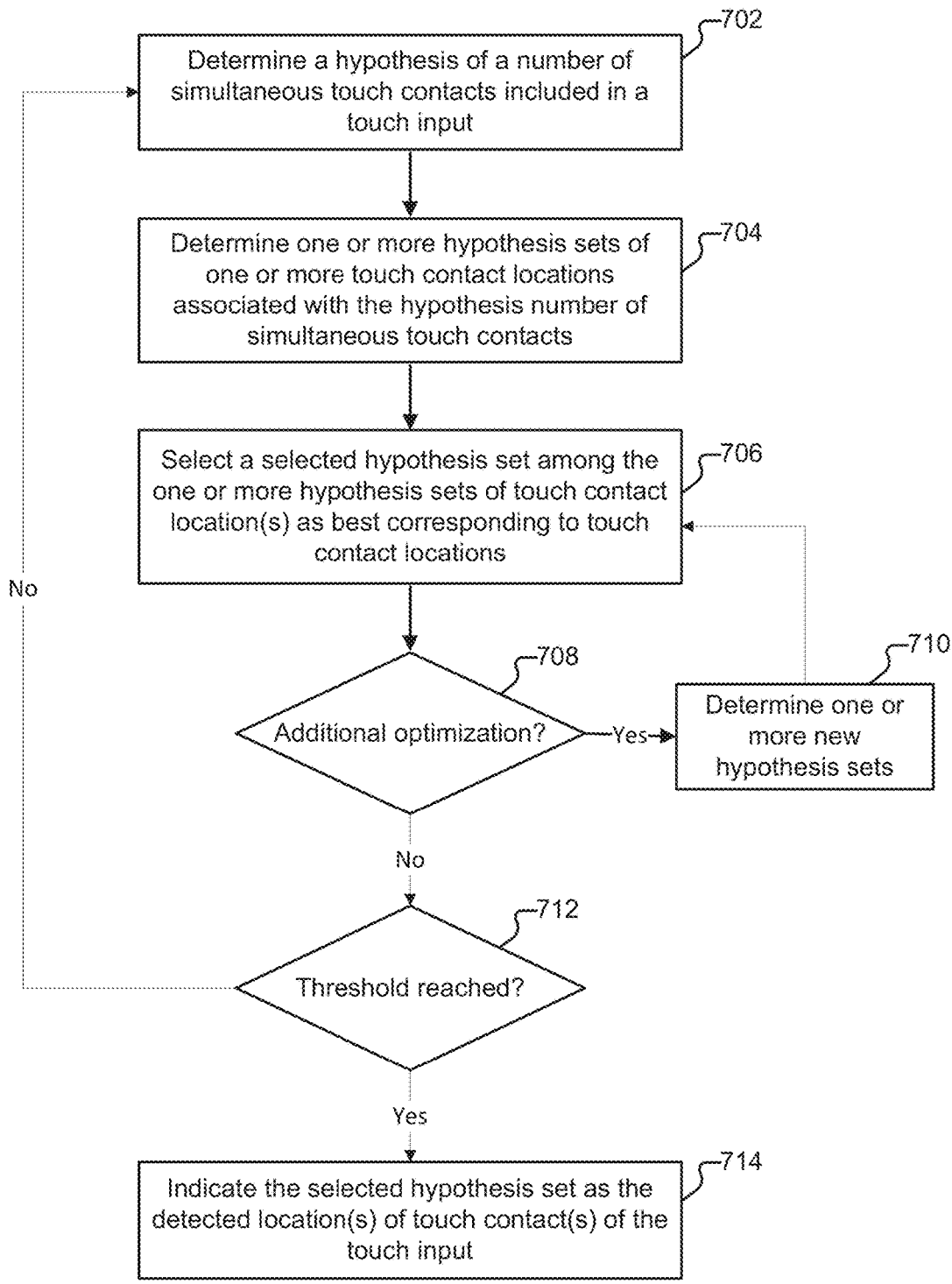
FIG. 7 is a flow chart illustrating an embodiment of a process comparing spatial domain signals with one or more expected signals to determine touch contact location(s) of a touch input.

FIG. 7 is a flow chart illustrating an embodiment of a process comparing spatial domain signals with one or more expected signals to determine touch contact location(s) of a touch input. In some embodiments, the process of FIG. 7 is included in 510 of FIG. 5. The process of FIG. 7 may be implemented in touch detector 120 of FIG. 1A and/or touch detector 202 of FIG. 2.

At 702, a hypothesis of a number of simultaneous touch contacts included in a touch input is determined. In some embodiments, when detecting a location of a touch contact, the number of simultaneous contacts being made to a touch input surface (e.g., surface of medium 102 of FIGS. 1A-1D) is desired to be determined. For example, it is desired to determine the number of fingers touching a touch input surface (e.g., single touch or multi-touch). In some embodiments, in order to determine the number of simultaneous touch contacts, the hypothesis number is determined and the hypothesis number is tested to determine whether the hypothesis number is correct. In some embodiments, the hypothesis number is initially determined as zero (e.g., associated with no touch input being provided). In some embodiments, determining the hypothesis number of simultaneous touch contacts includes initializing the hypothesis number to be a previously determined number of touch contacts. For example, a previous execution of the process of FIG. 7 determined that two touch contacts are being provided simultaneously and the hypothesis number is set as two. In some embodiments, determining the hypothesis number includes incrementing or decrementing a previously determined hypothesis number of touch contacts. For example, a previously determined hypothesis number is 2 and determining the hypothesis number includes incrementing the previously determined number and determining the hypothesis number as the incremented number (i.e., 3). In some embodiments, each time a new hypothesis number is determined, a previously determined hypothesis number is iteratively incremented and/or decremented unless a threshold maximum (e.g., 10) and/or threshold minimum (e.g., 0) value has been reached.

At 704, one or more hypothesis sets of one or more touch contact locations associated with the hypothesis number of simultaneous touch contacts are determined. In some embodiments, it is desired to determine the coordinate locations of fingers touching a touch input surface. In some embodiments, in order to determine the touch contact locations, one or more hypothesis sets are determined on potential location(s) of touch contact(s) and each hypothesis set is tested to determine which hypothesis set is most consistent with a detected data.

In some embodiments, determining the hypothesis set of potential touch contact locations includes dividing a touch input surface into a constrained number of points (e.g., divide into a coordinate grid) where a touch contact may be detected. For example, in order to initially constrain the number of hypothesis sets to be tested, the touch input surface is divided into a coordinate grid with relatively large spacing between the possible coordinates. Each hypothesis set includes a number of location identifiers (e.g., location coordinates) that match the hypothesis number determined in 702. For example, if two was determined to be the hypothesis number in 702, each hypothesis set includes two location coordinates on the determined coordinate grid that correspond to potential locations of touch contacts of a received touch input. In some embodiments, determining the one or more hypothesis sets includes determining exhaustive hypothesis sets that exhaustively cover all possible touch contact location combinations on the determined coordinate grid for the determined hypothesis number of simultaneous touch contacts. In some embodiments, a previously determined touch contact location(s) of a previous determined touch input is initialized as the touch contact location(s) of a hypothesis set.

At 706, a selected hypothesis set is selected among the one or more hypothesis sets of touch contact location(s) as best corresponding to touch contact locations captured by detected signal(s). In some embodiments, one or more propagated active signals (e.g., signal transmitted at 402 of FIG. 4) that have been disturbed by a touch input on a touch input surface are received (e.g., received at 404 of FIG. 4) by one or more sensors such as sensors 112, 114, 116, 118, 113, 115, 117, and 119 of FIGS. 1A-1D. Each active signal transmitted from each transmitter (e.g., different active signals each transmitted by transmitters 104, 106, 108, and 110 of FIGS. 1A-1D) is received by each sensor (e.g., sensors 112, 114, 116, 118, 113, 115, 117, and/or 119 of FIGS. 1A-1D) and may be processed to determine a detected signal (e.g., spatial domain signal determined at 508 of FIG. 5) that characterizes a signal disturbance caused by the touch input. In some embodiments, for each hypothesis set of touch contact location(s), an expected signal is determined for each signal expected to be received at one or more sensors. The expected signal may be determined using a predetermined function that utilizes one or more predetermined coefficients (e.g., coefficient determined for a specific sensor and/or transmitter transmitting a signal to be received at the sensor) and the corresponding hypothesis set of touch contact location(s). The expected signal(s) may be compared with corresponding detected signal(s) to determine an indicator of a difference between all the expected signal(s) for a specific hypothesis set and the corresponding detected signals. By comparing the indicators for each of the one or more hypothesis sets, the selected hypothesis set may be selected (e.g., hypothesis set with the smallest indicated difference is selected).

At 708, it is determined whether additional optimization is to be performed. In some embodiments, determining whether additional optimization is to be performed includes determining whether any new hypothesis set(s) of touch contact location(s) should be analyzed in order to attempt to determine a better selected hypothesis set. For example, a first execution of step 706 utilizes hypothesis sets determined using locations on a larger distance increment coordinate grid overlaid on a touch input surface and additional optimization is to be performed using new hypothesis sets that include locations from a coordinate grid with smaller distance increments. Additional optimizations may be performed any number of times. In some embodiments, the number of times additional optimizations are performed is predetermined. In some embodiments, the number of times additional optimizations are performed is dynamically determined. For example, additional optimizations are performed until a comparison threshold indicator value for the selected hypothesis set is reached and/or a comparison indicator for the selected hypothesis does not improve by a threshold amount. In some embodiments, for each optimization iteration, optimization may be performed for only a single touch contact location of the selected hypothesis set and other touch contact locations of the selected hypothesis may be optimized in a subsequent iteration of optimization.

If at 708 it is determined that additional optimization should be performed, at 710, one or more new hypothesis sets of one or more touch contact locations associated with the hypothesis number of the touch contacts are determined based on the selected hypothesis set. In some embodiments, determining the new hypothesis sets includes determining location points (e.g., more detailed resolution locations on a coordinate grid with smaller distance increments) near one of the touch contact locations of the selected hypothesis set in an attempt to refine the one of the touch contact locations of the selected hypothesis set. The new hypothesis sets may each include one of the newly determined location points, and the other touch contact location(s), if any, of a new hypothesis set may be the same locations as the previously selected hypothesis set. In some embodiments, the new hypothesis sets may attempt to refine all touch contact locations of the selected hypothesis set. The process proceeds back to 706, whether or not a newly selected hypothesis set (e.g., if previously selected hypothesis set still best corresponds to detected signal(s), the previously selected hypothesis set is retained as the new selected hypothesis set) is selected among the newly determined hypothesis sets of touch contact location(s).

If at 708 it is determined that additional optimization should not be performed, at 712, it is determined whether a threshold has been reached. In some embodiments, determining whether a threshold has been reached includes determining whether the determined hypothesis number of contact points should be modified to test whether a different number of contact points has been received for the touch input. In some embodiments, determining whether the threshold has been reached includes determining whether a comparison threshold indicator value for the selected hypothesis set has been reached and/or a comparison indicator for the selected hypothesis did not improve by a threshold amount since a previous determination of a comparison indicator for a previously selected hypothesis set. In some embodiments, determining whether the threshold has been reached includes determining whether a threshold amount of energy still remains in a detected signal after accounting for the expected signal of the selected hypothesis set. For example, a threshold amount of energy still remains if an additional touch contact needs be included in the selected hypothesis set.

If at 712, it is determined that the threshold has not been reached, the process continues to 702 where a new hypothesis number of touch inputs is determined. The new hypothesis number may be based on the previous hypothesis number. For example, the previous hypothesis number is incremented by one as the new hypothesis number.

If at 712, it is determined that the threshold has been reached, at 714, the selected hypothesis set is indicated as the detected location(s) of touch contact(s) of the touch input. For example, a location coordinate(s) of a touch contact(s) is provided.

Figure 8:
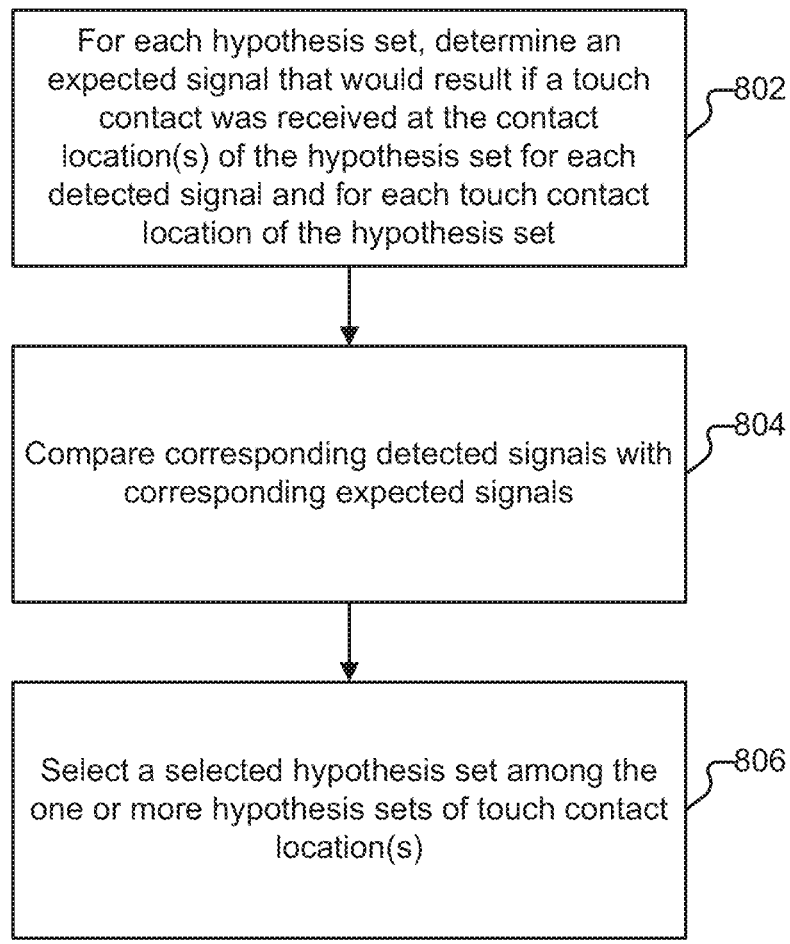
FIG. 8 is a flowchart illustrating an embodiment of a process for selecting a selected hypothesis set of touch contact location(s).

FIG. 8 is a flowchart illustrating an embodiment of a process for selecting a selected hypothesis set of touch contact location(s). In some embodiments, the process of FIG. 8 is included in 706 of FIG. 7. The process of FIG. 8 may be implemented in touch detector 120 of FIG. 1A and/or touch detector 202 of FIG. 2.

At 802, for each hypothesis set (e.g., determined at 704 of FIG. 7), an expected signal that would result if a touch contact was received at the contact location(s) of the hypothesis set is determined for each detected signal and for each touch contact location of the hypothesis set. In some embodiments, determining the expected signal includes using a function and one or more function coefficients to generate/simulate the expected signal. The function and/or one or more function coefficients may be predetermined (e.g., determined at 306 of FIG. 3) and/or dynamically determined (e.g., determined based on one or more provided touch contact locations). In some embodiments, the function and/or one or more function coefficients may be determined/selected specifically for a particular transmitter and/or sensor of a detected signal. For example, the expected signal is to be compared to a detected signal and the expected signal is generated using a function coefficient determined specifically for the pair of transmitter and sensor of the detected signal. In some embodiments, the function and/or one or more function coefficients may be dynamically determined.

In some embodiments, in the event the hypothesis set includes more than one touch contact location (e.g., multi-touch input), the expected signal for each individual touch contact location is determined separately and combined together. For example, an expected signal that would result if a touch contact was provided at a single touch contact location is added with other single touch contact expected signals (e.g., effects from multiple simultaneous touch contacts add linearly) to generate a single expected signal that would result if the touch contacts of the added signals were provided simultaneously.

In some embodiments, the expected signal for a single touch contact is modeled as the function:

$$C*P(x-d)$$

where C is a function coefficient (e.g., complex coefficient) and P(x) is a function and d is the total path distance between a transmitter (e.g., transmitter of a signal desired to be simulated) to a touch input location and between the touch input location and a sensor (e.g., receiver of the signal desired to be simulated).

In some embodiments, the expected signal for one or more touch contacts is modeled as the function:

$$\Sigma_{j=1}^{N} C_j P(x-d_j)$$

where j indicates which touch contact and N is the number of total simultaneous touch contacts being modeled (e.g., hypothesis number determined at 702 of FIG. 7).

At 804, corresponding detected signals are compared with corresponding expected signals. In some embodiments, the detected signals include spatial domain signals determined at 508 of FIG. 5. In some embodiments, comparing the signals includes determining a mean square error between the signals. In some embodiments, comparing the signals includes determining a cost function that indicates the similarity/difference between the signals. In some embodiments, the cost function for a hypothesis set (e.g., hypothesis set determined at 704 of FIG. 7) analyzed for a single transmitter/sensor pair is modeled as:

$$\epsilon(r_x, t_x) = |q(x) - \Sigma_{j=1}^{N} C_j P(x-d_j)|^2$$

where $\epsilon(r_x, t_x)$ is the cost function, $q(x)$ is the detected signal, and $\Sigma_{j=1}^{N} C_j P(x-d_j)$ is the expected signal. In some embodiments, the global cost function for a hypothesis set analyzed for more than one (e.g., all) transmitter/sensor pair is modeled as:

$$\epsilon = \Sigma_{i=1}^{Z} \epsilon(r_x, t_x)_i$$

where $\epsilon$ is the global cost function, Z is the number of total transmitter/sensor pairs, i indicates the particular transmitter/sensor pair, and $\epsilon(r_x, t_x)_i$ is the cost function of the particular transmitter/sensor pair.

At 806, a selected hypothesis set of touch contact location(s) is selected among the one or more hypothesis sets of touch contact location(s) as best corresponding to detected signal(s). In some embodiments, the selected hypothesis set is selected among hypothesis sets determined at 704 or 710 of FIG. 7. In some embodiments, selecting the selected hypothesis set includes determining the global cost function (e.g., function $\epsilon$ described above) for each hypothesis set in the group of hypothesis sets and selecting the hypothesis set that results in the smallest global cost function value.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A touch input detector, comprising:
   An acoustic transmitter configured to transmit a freely propagating acoustic signal through a touch input medium with a touch input surface, wherein the freely propagating acoustic signal from the acoustic transmitter has been allowed to freely propagate through the touch input medium in multiple directions to a plurality of receivers on a plurality axes of the touch input medium;
   an acoustic receiver configured to receive the freely propagating acoustic signal that has been disturbed by a touch input contacting the touch input surface, wherein the timing of the incidence of the received signal on the acoustic receiver indicates at least a portion of a touch input location of the touch input on the touch input surface; and
   an acoustic dampening material coupled to the touch input medium to dampen reflections of the freely propagating acoustic signal, wherein a thickness of the acoustic dampening material increases from a first edge of the acoustic dampening material to a second edge of acoustic dampening material, the thinner first edge of the acoustic dampening material is closer to the plurality receivers than the thicker second edge of the acoustic dampening material, the acoustic dampening material is configured to dampen at least a portion of the freely propagating acoustic signal reaching, via propagation through the touch input medium, the thinner first edge of the acoustic dampening material that is closer to the acoustic transmitter than the thicker second edge of the acoustic dampening material, and the first edge of acoustic dampening material and the second edge of acoustic dampening material at least in part define parallel edges of a strip of the acoustic dampening material coupled to a back surface of the touch input medium that is opposite a front surface of the touch input medium configured to receive the touch input and an attenuation property of the acoustic dampening material gradually varies across at least a portion of the acoustic dampening material.

2. The touch input detector of claim 1, wherein the acoustic transmitter is a first transducer and the acoustic receiver is a second transducer.

3. The touch input detector of claim 1, wherein the touch input medium includes a glass panel.

4. The touch input detector of claim 1, wherein the freely propagating acoustic signal from the acoustic transmitter has been allowed to freely propagate through the touch input medium in multiple directions to the plurality of receivers on the plurality axes of the touch input medium without encountering a fixed Surface Acoustic Wave reflector while traveling from the acoustic transmitter to the plurality of receivers.

5. The touch input detector of claim 1, wherein the acoustic transmitter and the acoustic receiver are coupled to the touch input medium on the back surface of the touch input medium.

6. The touch input detector of claim 1, wherein the acoustic dampening material includes an elastomer.

7. The touch input detector of claim 1, wherein the acoustic dampening material includes an elastomer with one or more stiff constraining layers.

8. The touch input detector of claim 1, wherein the acoustic dampening material includes an elastomer loaded with heavy particles.

9. The touch input detector of claim 1, wherein at least a portion of the acoustic dampening material surrounds at least a portion of a region of the touch input medium in between the acoustic transmitter and an edge of the touch input medium.

10. The touch input detector of claim 1, wherein at least a portion of the acoustic dampening material is anechoic in shape.

11. The touch input detector of claim 1, wherein the acoustic dampening material includes a plurality of triangular protrusions.

12. The touch input detector of claim 11, wherein one or more of the triangular protrusions are shaped in one or more of the following shapes: an exponential shape, a logarithmic shape, or a parabolic shape.

13. The touch input detector of claim 1, wherein an acoustical impedance of the acoustic dampening material varies from one edge of the acoustic dampening material to another edge of the acoustic dampening material.

14. The touch input detector of claim 1, wherein a density of the acoustic dampening material varies from one edge of the acoustic dampening material to another edge of the acoustic dampening material.

15. The touch input detector of claim 1, wherein the attenuation property of the acoustic dampening material varies non-homogeneously within at least a portion of the acoustic dampening material.

16. The touch input detector of claim 1, wherein the acoustic dampening material includes a triangular protrusion and a height of the triangular protrusion is configured to be at least 2.5 times longer than a length of a base of the triangular protrusion.

17. The touch input detector of claim 1, wherein the acoustic dampening material includes a triangular protrusion and a height of the triangular protrusion is configured to be at least ¼ of a wavelength of a largest wavelength of the transmitted acoustic wave desired to be attenuated by the acoustic dampening material.

18. The touch input detector of claim 1, wherein the acoustic dampening material is coupled to the touch input medium using an adhesive patterned in an anechoic shape.

19. The touch input detector of claim 1, wherein the acoustic dampening material is coupled to the touch input medium using a clamp shaped in an anechoic shape.

20. The touch input detector of claim 1, wherein the touch input medium is etched in an anechoic shape.

* * * * *

UNITED STATES PATENT AND TRADEMARK OFFICE
CERTIFICATE OF CORRECTION

PATENT NO. : 9,880,671 B2
APPLICATION NO. : 14/156731
DATED : January 30, 2018
INVENTOR(S) : Lapoe E. Lynn et al.

Page 1 of 1

It is certified that error appears in the above-identified patent and that said Letters Patent is hereby corrected as shown below:

In the Specification

In Column 22, Line 39, delete "$\Sigma_{j=1}^{N} C_j P(x-d_j)$", insert -- $\sum_{j=1}^{N} C_j P(x-d_j)$ --, therefor.

In Column 22, Line 56, delete "$\epsilon(r_x, t_x) = |q(x) - \Sigma_{j=1}^{N} C_j P(x-d_j)|^2$", insert -- $\varepsilon(r_x, t_x) = |q(x) - \sum_{j=1}^{N} C_j P(x-d_j)|^2$ --, therefor.

In Column 22, Line 58, delete "$\Sigma_{j=1}^{N} C_j P(x-d_j)$", insert -- $\sum_{j=1}^{N} C_j P(x-d_j)$ --, therefor.

In Column 22, Line 63, delete "$\epsilon = \Sigma_{i=1}^{Z} \epsilon(r_x, t_x)_i$", insert -- $\varepsilon = \sum_{i=1}^{Z} \varepsilon(r_x, t_x)_i$ --, therefor.

Signed and Sealed this
Third Day of July, 2018

Andrei Iancu
*Director of the United States Patent and Trademark Office*